Patented Mar. 26, 1935

1,995,663

UNITED STATES PATENT OFFICE 1,995,663

COSMETICAL PREPARATION

Martin Bollmann, Dessau in Anhalt, Germany, assignor to Winthrop Chemical Company, Inc., New York, N. Y., a corporation of New York No Drawing. Application August 14, 1934, Serial No. 739,840. In Germany December 29, 1932

16 Claims. (Cl. 167—91)

For making powders and other cosmetic preparations the magnesium and zinc salts of stearic acid are generally used together with, for instance, talcum, rice, starch, magnesium carbonate and so on.

This invention consists in making cosmetic preparations with the aid of salts insoluble in water, particularly magnesium salts and zinc salts, of such aliphatic acids as contain an odd number of carbon atoms.

A further object of the invention are the new insoluble non-poisonous salts of the said acids.

The said salts, when compared with the stearates hitherto used, are distinguished by their pure color and especially by the softness and fineness of the products made with them. On the skin they behave similarly to fats and can be remarkably well rubbed in, being then very firmly retained. They spread and coat more freely and uniformly than the products made with the aid of the corresponding stearates.

There come into question for the invention the salts of saturated fatty acids having an odd number of carbon atoms ranging from 7-17. Such acids are heptylic acid, nonylic acid, tridecylic acid, pentadecylic acid and heptadecylic acid. Of this series, the salts of heptylic, nonylic undecylic and tridecylic acid have particularly favorable properties. It is very surprising that the salts of the acids having an odd number of carbon atoms have remarkably better properties for the purpose set forth than the salts of acids with an even number of carbon atoms. This holds true even when comparing, for instance, zinc or magnesium undecylate with the corresponding salts of capric acid or lauric acid, that means, with its nearest homologous compounds. In the case of salts of heptylic or nonylic acid, preferably a small amount of a perfume is added to the cosmetic preparations made with these products, in order to mask the odor owing to these salts.

The salts in question can be made easily, for example by mixing an alcoholic solution or aqueous alcoholic solution of an alkali salt of the fatty acid with an aqueous solution of any magnesium salt or zinc salt. Even when mixed with comparatively large proportions of other materials the salts in question exhibit their valuable properties.

The following examples of cosmetics illustrate the invention:—

Example 1.—Rice powder

| | Grams |
|---|---|
| Finest rice flour | 60 |
| Titanium white | 20 |
| Zinc or magnesium undecylate | 40 |
| Magnesium carbonate | 5 |

Example 2.—Talc powder

| | Grams |
|---|---|
| Talc | 800 |
| Kaolin | 700 |
| Zinc or magnesium undecylate | 100 |
| Magnesium carbonate | 100 |
| Titanium white | 100 |

Example 3.—Fluid powder

| | Grams |
|---|---|
| Zinc or magnesium undecylate | 40 |
| Titanium white | 80 |
| Talc | 105 |
| Glycerin | 60 |
| Water | 800 |

Example 4.—Face cream 18 grams of stearin are saponified in
160 grams of water by means of
10 grams of borax,
30 grams of glycerin and
1.8 grams of calcium carbonate, and into the mass are stirred
10 grams of zinc undecylate or magnesium undecylate.

In the foregoing examples there may be used instead of zinc or magnesium undecylate a corresponding salt of another saturated fatty acid having an uneven number of carbon atoms. Mixtures of the salts in question may also be used.

Other non-poisonous salts of the said acids as, for instance, the titanium salts, likewise are suitable.

The present application is a continuation-in-part of my copending application Serial No. 694,692, filed October 21, 1933.

What I claim is:—

1. Cosmetic preparations containing an insoluble, non-poisonous metal salt of an aliphatic acid as contains an odd number of carbon atoms of 7 C. to 17 C.

2. Cosmetic preparations containing a zinc salt of an aliphatic acid as contains an odd number of carbon atoms of 7 C. to 17 C.

3. Cosmetic preparations containing an insoluble non-poisonous metal salt of an aliphatic acid of the group consisting of nonylic acid, undecylic acid and tridecylic acid.

4. Cosmetic preparations containing a zinc salt of an aliphatic acid of the group consisting of nonylic acid, undecylic acid and tridecylic acid.

5. Cosmetic preparations containing an insoluble non-poisonous metal salt of undecylic acid.

6. Cosmetic preparations containing zinc undecylate.

7. Cosmetic preparations containing magnesium undecylate.

8. A face powder containing rice flour and an insoluble non-poisonous metal salt of an aliphatic acid as contains an odd number of carbon atoms of 7 C. to 17 C.

9. A face powder containing talc and an insoluble non-poisonous metal salt of an aliphatic acid as contains an odd number of carbon atoms of 7 C. to 17 C.

10. A face powder containing rice flour and zinc undecylate.

11. A face powder containing talc and zinc undecylate.

12. The insoluble non-poisonous metal salts of undecylic acid, said salts forming pure white powders easily distributable on the human skin and fastly adhering to the latter.

13. A cold cream containing glycerin and zinc undecylate.

14. As a new product the insoluble salts of undecylic acid with a metal of the group consisting of magnesium and zinc, said salts forming pure white powders easily distributable on the human skin and fastly adhering to the latter.

15. As a new product magnesium undecylate.

16. As a new product zinc undecylate.

MARTIN BOLLMANN.